Nov. 10, 1936.  W. P. SCOTT  2,060,130
BOTTOM DUMP VEHICLE
Filed Nov. 18, 1935
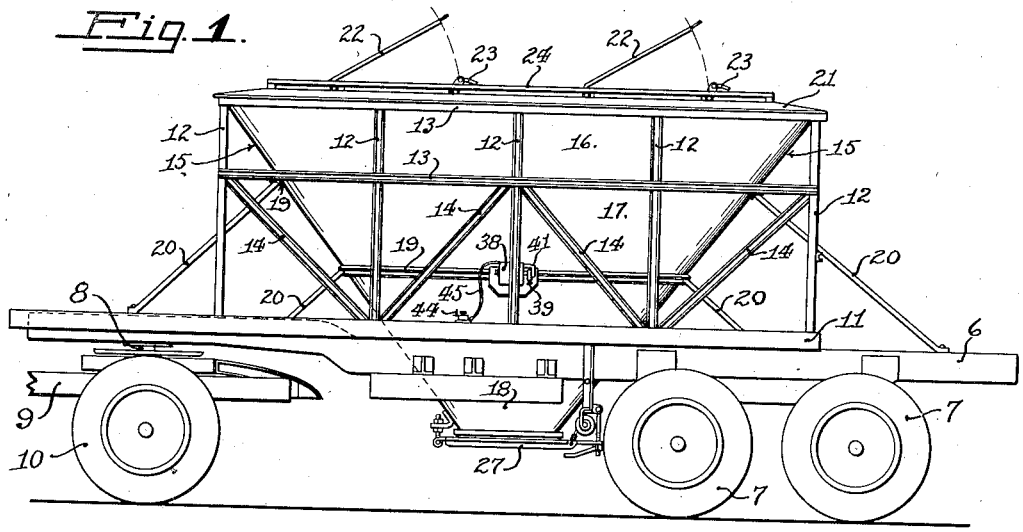
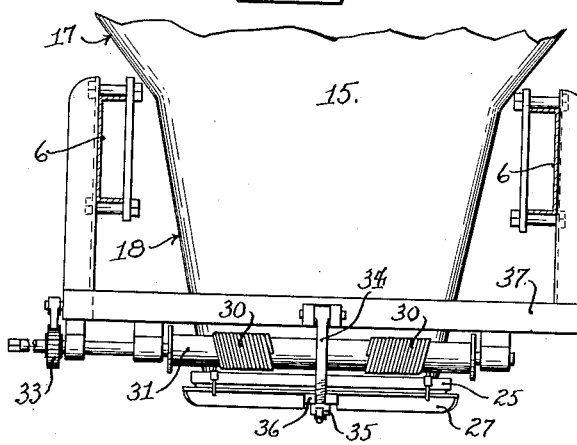
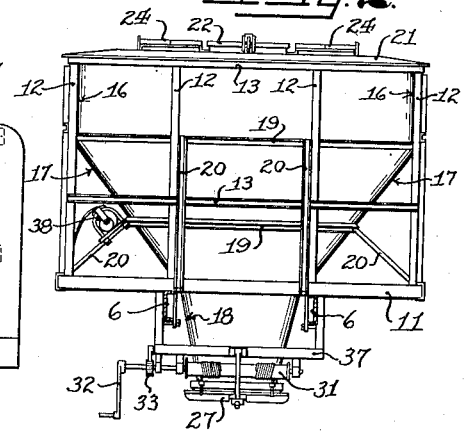
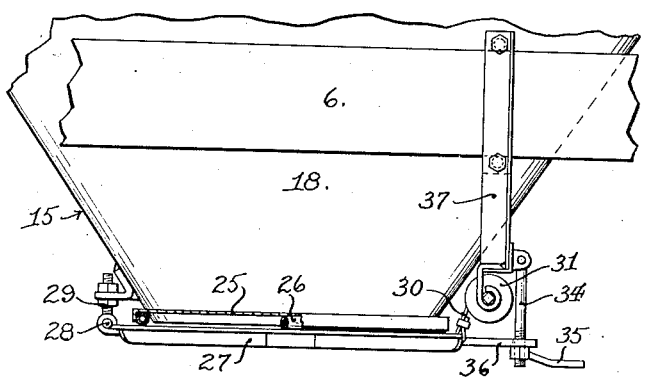
INVENTOR,
William Proctor Scott
BY Booth & Booth
ATTORNEYS.

Patented Nov. 10, 1936

2,060,130

UNITED STATES PATENT OFFICE 2,060,130

BOTTOM DUMP VEHICLE

William Proctor Scott, Oakland, Calif.

Application November 18, 1935, Serial No. 50,285

2 Claims. (Cl. 298—30)

The present invention relates to hopper type dump vehicles for transporting bulk materials in either dry or liquid form.

The general objects of the invention are to provide a vehicle of large load carrying capacity in which the center of gravity is sufficiently low to insure stability; to provide an inclosed container body which, although capable of being filled and emptied rapidly, can be sealed to prevent deterioration of the load either by evaporation or by the entrance of moisture from without; to provide simple means for vibrating the container to an extent sufficient to permit complete and rapid dumping of the load; and to provide a simple and inexpensive dump construction which eliminates the costly hoists usually employed in dump bodies. These and other objects and advantages of the invention will be elaborated in the following specification, which should be read with the understanding that the form, construction and arrangement of the several parts described and illustrated may be varied, within the limits of the appended claims, without departing from the spirit of the invention.

In its preferred form as described and illustrated herein, the invention is embodied in a highway trailer adapted to be drawn by a tractor. However, it will be apparent that the principles of the invention may be incorporated in other types of vehicles without material alteration.

Reference will be made to the accompanying drawing, in which

Fig. 1 is a side elevation of the vehicle.

Fig. 2 is a rear elevation of the body portion.

Fig. 3 is an enlarged rear elevation of the lower portion of the container.

Fig. 4 is a side elevation of the same.

Fig. 5 is an enlarged end elevation of the vibrating mechanism.

In the drawing, the reference numeral 6 designates the main frame of a trailer vehicle, supported at its rear end by wheels 7, and at its forward end by the usual fifth-wheel connection 8 with a tractor 9, the rear driving wheels of the tractor being indicated at 10. A body frame 11 is mounted upon the chassis frame 6 in any suitable manner.

The superstructure of the body, which is supported by the body frame 11, comprises a rectangular skeleton frame having uprights 12, horizontal members 13, and diagonal braces 14. Within this skeleton frame and suspended from it is the container, formed of sheet metal in the shape of a rectangular hopper. The end walls 15 of said hopper slope continuously from the top of the skeleton frame to a point below the main chassis frame, as shown in Fig. 1. The side walls, as shown in Fig. 2, are vertical at the top, as at 16, then slope inwardly as at 17, and end at the bottom with a steeper slope, as at 18. The hopper is surrounded by horizontal reinforcing ribs 19, from which braces 20 extend diagonally down to the main frame members 6 and 11.

The top of the container or hopper is enclosed with a permanent tight cover or roof 21, in which are hinged trap-doors 22 provided with suitable latches indicated at 23. These trap-doors, when open, give access to the container for loading, and for cleaning when necessary. Any suitable means, not shown, may be provided for making said trap-doors water tight when closed. Catwalks 24 are preferably mounted on the roof 21 on either side of the trap-doors.

The bottom of the hopper is surrounded by a channel flange 25, Fig. 4, in which is seated a resilient tubular gasket 26. A hinged gate 27 seats against said gasket to make a tight closure for the bottom of the hopper. The hinge 28 of said gate is carried by vertically adjustable threaded studs, one of which is shown at 29, so that the seating of said gate against the gasket may be made even on all sides of the opening. The gate is raised and lowered by cables 30 which are secured to said gate and wound upon a drum 31, said drum being mounted upon a horizontal shaft provided with a removable crank 32, Fig. 2. A pawl and ratchet device 33, shown in Figs. 2 and 3, prevents unwinding of the cables. The gate is further held closed by a clamp consisting of a swinging stud 34 provided with a wing nut 35 which engages a forked or slotted lug 36 extending from the gate. The drum 31 and clamp 34 are supported by a bracket 37 which extends downwardly from the vehicle frame members 6.

A vibrator is provided for the hopper, comprising an electric motor 38, Figs. 1, 2 and 5, which has an eccentric fly-wheel 39 secured upon the projecting end of its shaft 40. An outboard bearing for the end of said shaft 40 beyond the eccentric fly-wheel is provided by a bracket 41 extending outwardly from the motor frame. The motor 38 is preferably secured by a strap 42 to a base plate 43 which is fastened to one of the diagonal braces 20 close to one side of the hopper. A suitable casing, not shown, may enclose the motor and eccentric fly-wheel.

A hand-operated switch 44, Fig. 1, is mounted in a convenient position at the side of the vehicle, said switch being inserted in suitable electric conductors, shown in part at 45, which lead from the battery of the tractor to the motor 38. When the motor is operated, by closing the switch 44, the rapid rotation of the eccentric fly-wheel 39 sets up a vibration of the entire motor and its mounting, which is communicated to the hopper by the brace 20 and the horizontal reinforcing rib 19. This vibration is sufficient to prevent bridging or sticking of the material within the hopper while being dumped therefrom. The vibrator need be operated only momentarily and occasionally during the unloading operation.

I claim:

1. In a bottom-dump vehicle, a container body having sheet metal sides inclined inwardly and downwardly to form a hopper bottom terminating in a dumping aperture, an angle member secured to the exterior of said sheet metal sides near said aperture, said angle member having a downwardly extending flange spaced outwardly from said sheet metal sides to form a channel therebetween, a resilient gasket seated in said channel, and a gate hinged to swing against said gasket to form a tight closure for said aperture.

2. In a bottom-dump vehicle having a main frame, a skeleton frame rising therefrom and comprising upright members and horizontal members, a sheet metal container within said skeleton frame, the upper portion of said container being secured to and suspended from the horizontal members in the upper portion of said skeleton frame, and the sides of said container sloping inwardly and downwardly in the form of a hopper, reinforcing ribs secured to the sloping sides of said container, and inclined braces extending outwardly and downwardly from said ribs to said main frame, said ribs and braces being independent of said skeleton frame whereby the weight of said container and its load is suspended from said skeleton frame and braced against horizontal stresses by said ribs and braces extending directly to said main frame.

WILLIAM PROCTOR SCOTT.